Nov. 24, 1925.

A. W. KNUTSON 1,563,092

ATTACHMENT FOR MOTOR VEHICLES

Filed June 4, 1920  5 Sheets-Sheet 3

INVENTOR
Alfred W. Knutson
BY
Chas. H. LaPorte
ATTORNEY

Nov. 24, 1925.　　　　　　　　　　　　　　　　1,563,092
A. W. KNUTSON
ATTACHMENT FOR MOTOR VEHICLES
Filed June 4, 1920　　　　5 Sheets-Sheet 4

Patented Nov. 24, 1925.

1,563,092

UNITED STATES PATENT OFFICE.

ALFRED W. KNUTSON, OF GALESBURG, ILLINOIS, ASSIGNOR TO ALVIN V. ROWE, OF GALESBURG, ILLINOIS.

ATTACHMENT FOR MOTOR VEHICLES.

Application filed June 4, 1920. Serial No. 386,536.

*To all whom it may concern:*

Be it known that I, ALFRED W. KNUTSON, a citizen of the United States, a resident of Galesburg, in the county of Knox and State of Illinois, have invented new and useful Improvements in Attachments for Motor Vehicles, of which the following is a specification.

This invention has reference to rein control means for motor propelled vehicles, such as farm tractors, automobiles and the like.

The principal object of the invention is to provide a rein control attachment which is applicable to motor propelled vehicles now in use, as distinguished from vehicles or tractors which embody rein or line controls that are especially built with or for use with such controls.

A further object of the invention is to provide a self contained attachment of the character and for the purposes referred to, which is formed for bodily securement to the vehicle, and which includes rein control means for the steering appliances of the vehicle, control lever, clutch lever and fuel supply actuating elements.

The invention has for a further object to provide an attachment arranged for bodily securement to a motor propelled vehicle, the same being equipped to convert such vehicle into the rein controlled type and includes preferably two reins, a pull on either one of which may cause the steering of the vehicle, and a direct pull on both said reins controlling the fuel supply, clutch and control levers; the operation of the fuel supply means, clutch lever and control lever depending on the degree of pull upon the said two reins in unison, and through the sense of feel of the operator.

The the invention may be more fully understood, reference is had to the accompanying drawings forming a part of the description, illustrating the preferred embodiment of the invention, in which:

Figure 11 is a detail plan of the parts immediately in control of the control lever;

Figure 12 is an end view of the parts seen in Figure 11, and with the control lever shown in different positions, in dotted lines;

Figure 13 is a detail in front elevation showing a slidable member and rein connected arms or cranks for releasing and sliding said member when a pull is exerted on the reins;

Figure 14 is a detail in cross-section illustrating the locking means for the slidable member shown in Figure 13, and Figures 15 and 16 show opposite elevations of the arms or cranks seen in Figure 13.

Like characters of reference denote corresponding parts throughout the figures.

Figure 2:
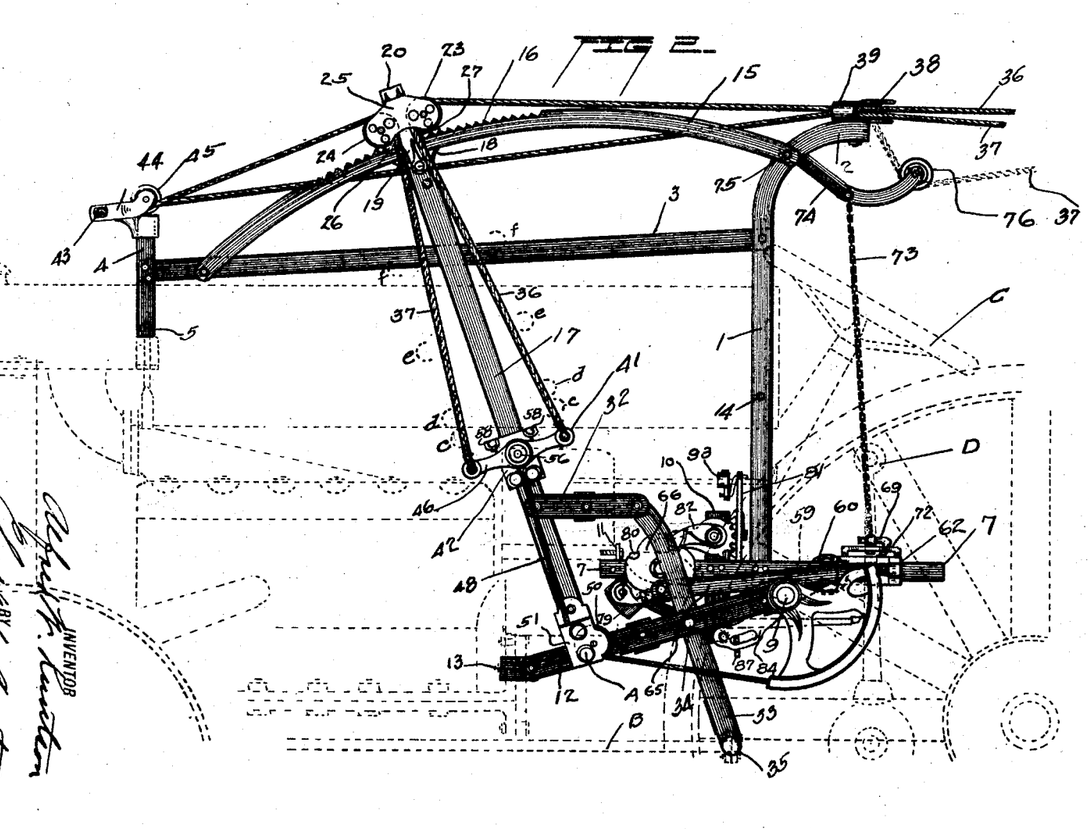
Figure 2 is a side elevation of part of a motor propelled vehicle, shown in dotted lines, with my attachement applied thereto, in full lines.

*In general.*—For purposes of convenience and general understanding of the rein control attachment for motor vehicles, the present disclosure is designed for bodily securement to a tractor of the "Fordson" type, and such a tractor is shown in dotted lines in Figure 2 with my rein control attachment attached thereto and coupled to the working parts, such as the steering appliance, control lever, clutch lever and fuel supply devices. In this particular designed tractor, the control lever is of the H throw type; i. e., normally in a neutral position and movable forward in the left hand slot for low speed; backward in the left hand slot for medium speed; swung over and forward in the right hand slot for high, and back in the right hand slot for reverse.

I prefer to employ only two reins in the control of the movements of the vehicle, including the actuation of the fuel supply devices. A pull on one rein actuating the steering appliances to turn the vehicle in one direction and a pull on the other rein actuating the steering appliances to turn the vehicle in the other direction; a direct pull on both said reins in unison actuating the fuel supply devices, releasing the clutch lever and oscillating the control lever, moving it from a neutral position, to low, medium or high, as desired, depending on the degree of pull on the said two reins and through the sense of feel of the operator.

This rein controlled attachment, with modifications, may be designed for bodily securement to different types and designs of motor propelled vehicles, and I, therefore, do not wish to be confined to its attachment only to tractors of the "Fordson" type, because of my selection of it for illustrative purposes.

Further, my rein control attachment is so constructed, as will become apparent, that selective operations are easily made. That is, steering of the vehicle, may be accomplished without disturbing the clutch and control levers or the fuel supply; and likewise, actuation of the fuel supply, clutch and control levers may be accomplished without disturbing the steering appliances, and finally the fuel supply devices may be actuated through the reins to give more gas without affecting the other elements mentioned. Also, without the removal of the attachment as a whole, but by the simple disconnection of an element or two, the operator may control the steering appliances, fuel supply and clutch control levers in the manner originally intended in the operation of the vehicle.

By the use of my rein controlled attachment a motor propelled vehicle may be converted into a rein controlled vehicle, and the usual movements of said vehicle and its fuel supply controlled at a point distant therefrom and from any vehicle connected to and drawn by said motor propelled vehicle.

*Attachment frame.*—The frame supporting the working parts of the rein control attachment and which is designed for bodily securement to the vehicle body, includes the upstanding angle iron bar 1 curved rearwardly at its upper end to provide a rest 2 for a rein guide. Connected to said bar 1 at or near its upper end and extending forwardly therefrom, is an angle iron bar 3, which at its forward end is connected to a short upright bar 4 arranged for securement at 5 to a part of the vehicle body or frame, and intended to support a sheave wheel guide for the reins. The lower end of said bar 1 has connected thereto, two bars 6 and 7. The former is designed to extend transversely across the vehicle body and be secured to a part of the vehicle body or frame, and the opposite ends of said bar 6 are turned backward at right angles, as at 8, 8, to provide bearings for a rock shaft 9. The bar 7 extends across the bar 1 and will lie longitudinally of the vehicle body and on its rear end supports a slidable bracket. At its forward end the bar 7 has connected thereto the short upstanding angle iron bar 10 to support certain of the fuel supply actuating means. Said bar 7 at its forward end, also, is bolted or otherwise suitably secured to a part of the vehicle frame or body through an arm 11 secured to said bar 7. The outer end of the shaft 9 passes through a pair of parallel arranged but spaced bars 12 which, at their forward ends are connected to a brace bar 13 adapted for securement to a part of the vehicle frame or body. The upstanding bar 1 may have connection with a part of the vehicle frame or body, at 14, and connecting the bar 1 and the bar 3, near its forward end is an arc shaped bar 15 provided with a plurality of notches or teeth 16, the same constituting a segment-rack, the arc of which is preferably struck from a point A forming the fulcrum point of an oscillatory bar. The parts described, with the exception of the shaft 9, constitute the frame supporting parts of the rein attachment.

*Rein steering.*—17 designates the oscillatory bar pivoted at A to the bars 12 of the frame and extending upwardly crosses the bar 3 and the segment rack 15. To one side of the bar 17 is secured a guide casting 18 which receives the rack 15 and prevents lateral separation of the bar and rack as the bar 17 is oscillated. Pivotally connected to the opposite side of said bar 17 is a bracket casting 19, and said casting has a part 20 overhanging the upper end of said bar 17. Said casting 19 is also provided or formed with a laterally extending pin 21 from its inside face which passes through an enlarged opening 22 in the oscillatory bar 17. Said casting has journaled thereon, a pair of spaced sheave wheels 23 and 24 protected by a shed 25 on said casting. On the bar 17 immediately above the teeth 16 on the rack 15, are pivoted a pair of dogs 26 and 27, which are arranged to have engagement with the teeth 16 on the rack 15, and said dogs have intermeshing teeth 28 and 29, respectively, whereby when movement is imparted to one dog a corresponding movement is imparted to the other dog. These dogs are normally held in engagement with teeth of the rack 15 by the spring 30 connected to the two dogs, and said dogs have shoulder portions 31 which normally overlie the opening 22 in the bar 17 and upon opposite sides of the pin 21 on the pivoted casting 19. It should be apparent that when the casting 19 is oscillated in either direction, it will move the pin 21 on the slot 22 in the bar 17 and cause it to engage with one or the other of the dogs 26 or 27 and cause oscillation thereof, and through the intermeshing teeth 28 and 29 of the dogs oscillate the other dog, thereby releasing both said dogs from engagement with teeth on the rack 15, and thus permit the bar 17 to be oscillated. Engagement of the dogs 26 and 27 with the teeth on the bar 17 locks the steering appliances, but in the event of a desire to release these locking elements in the manner above indicated, the dogs 26 and 27 may be swung upward and back on their pivots to be held by the spring 30, as under normal conditions.

To the bar 17, at a point near its lower end, are connected preferably a pair of links 32, which at their opposite ends have connection with the upper end of a lever bar 33. This bar passes down between the bars 12 of the frame, is pivoted thereto at 34, and the lower end of said lever bar is coupled at 35 to the lower end of a crank-arm, (not shown) and to the inner end of a rod B extending forward of the vehicle and suitably coupled to other elements, not shown, forming part of the steering appliances. The crank-arm, referred to but not shown, which is coupled to the rod B passes out of the engine frame or casing of the vehicle coincident with the pivotal point 34 of the lever bar 33. Thus, the lever bar 33 and the crank-arm, not shown, which forms one of the elements of the steering appliances oscillate on coincident axes. This crank-arm, not shown, is a well known element in the "Fordson" tractor and is actuated in a suitable manner from the usual steering post of the tractor which has the hand steering wheel C.

The bar 17 may be oscillated on its pivot A by means of the reins 36 and 37. These reins pass through a guide casting 38 having spaced throats 39 and 40 to receive the respective reins 36 and 37. The rein 36 passes over the sheave wheel 23 on the bar 17, and has an end connected to an arm 41 which has a pivotal connection with a casting 42 slidably carried on the bar 17. The rein 37 passes around a sheave wheel 43 journaled on a vertical axis in a casting 44 secured to the upper end of the frame part 4, and thence passes under a sheave wheel 45 journaled on a horizontal axis in the said casting 44, see Figures 1, 2, 9 and 10, and thence over the sheave wheel 24 on the bar 17 and has an end connected to an arm 46 which has a pivotal connection with said casting 42. Such pivotal connection with the said casting is also coincidental with the pivot of the arm 41 with said casting. A pull on either line 36 or 37 will release the dogs 26 and 27 on the bar 17, as explained, and permit said bar to be oscillated on the pivot A, and such oscillation will in turn oscillate the lever bar 33 and impart a reciprocal movement to the bar B, resulting in a steering of the vehicle to the right or left, depending, of course, on which rein 36 or 37 is pulled. The arrangement of the sheave wheels 43 and 45 is such as to prevent dislocation or disarrangement of the rein 37 from the guide-casting 38 to the sheave wheel 24 on the oscillatory bar 17.

*Control lever control.*—Included in the controlling means for the control lever of the motor vehicle, through the reins 36 and 37, are certain of the elements included in the steering means forming a part of the rein steering. In other words, certain of the primary elements necessary to the successful steering of the steering appliances on the motor vehicle through the reins, are employed as supporting and coacting elements in the rein control for the control lever of the vehicle.

On one end of the rock shaft 9 is secured a segment disc or plate 47, which when oscillated by the reins, will impart a corresponding oscillatory motion to the rock shaft 9. The periphery of this disc or plate 47 is grooved, and in such groove lies preferably a cable or rope 48 secured at 49 to what may be termed the upper end of the groove in said disc or plate. The cable or rope 48 passing from the groove of the disc or plate 47, passes around a sheave wheel 50 journaled in a bracket or casting 51 secured to the lower end of the oscillatory bar 17, and said cable or rope passing out of said bracket or casting, extends up to and is secured to the lower end of the casting 42, slidably carried on the oscillatory bar 17. It should be apparent that upward movement of the slidable casting 42, occasioned by a pull on the reins 36 and 37 will exert a pull on the rope or cable 48, oscillating the segment disc or plate 47, which in turn will impart a corresponding rocking or oscillatory motion to the rock shaft 9. The axis of the cable or rope 48 as it passes around the sheave wheel 50, coincides with the pivotal point A of the oscillatory bar 17. This arrangement, as should be understood, is such that when the bar 17 is oscillated by a pull on either one of the reins 36 or 37 for steering the vehicle, there will be no movement of the cable or rope 48, and no disturbance of the parts intended to be actuated by the segment disc or plate 47 and the rock shaft 9; so that the bar 17 may be oscillated on its fulcrum point A during the steering movements through the reins, without disturbing any of the parts intended to be, and which are actuated, when the cable or rope 48 is reciprocated, and it is only when said cable or rope 48 is pulled up and down through the reciprocation of the casting 42 on the bar 17, that any motion is imparted through the segment plate or disc 47 to the rock shaft 9.

Figure 1:
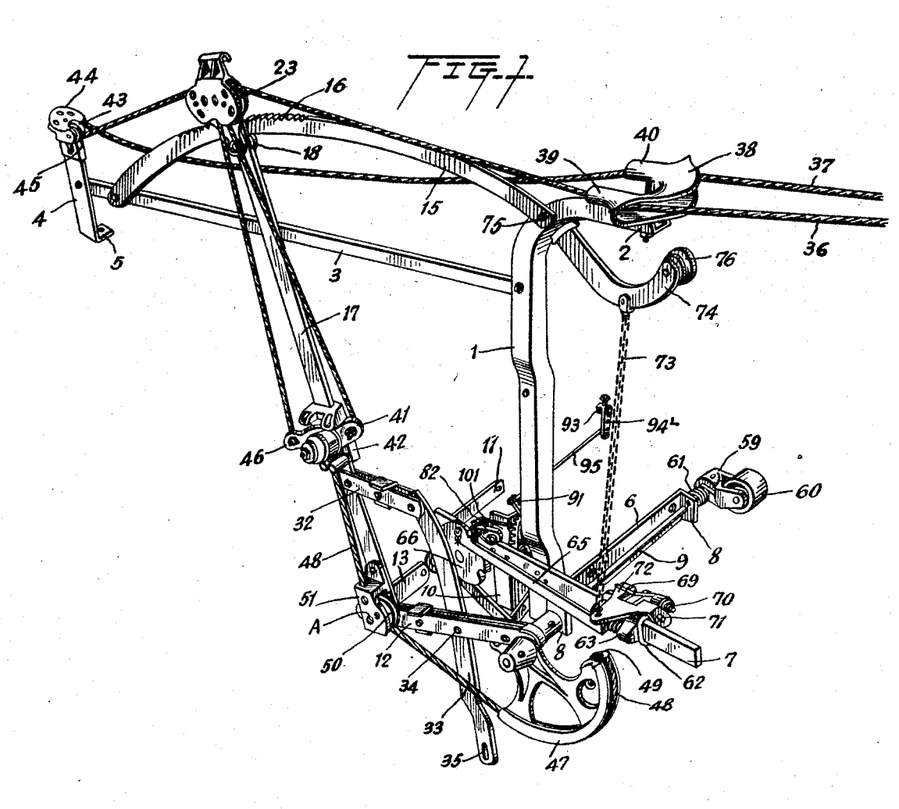
Figure 1 is a perspective view of an attachment embodying my invention.

The slidable casting 42 is locked in its normal lower position shown in Figures 1 and 2, by means of a plunger 52 which enters an opening or slot 53 in the oscillatory bar 17, see Figure 14. The plunger 52 is carried in the cylinder or sleeve 54, projecting laterally from the body of the casting 42 and within said sleeve or cylinder and encircling a reduced end portion of the plunger 52, is a spring 55 which, as will be understood, is compressed when the plunger is withdrawn from the opening or slot 53 in the bar 17, and under the pressure of the spring 55 is again forced into said slot or opening 53 when the casting 42 again reaches its lowermost or normal position on the bar 17. The cylinder or sleeve 54 is long enough to receive the coadjacent hubs of the arms 41 and 46, which are fulcrumed on said cylinder or sleeve of the casting 42, and to which the reins 36 and 37 are connected, as previously described, and 56 is a cap plate encircling the outer end of the cylinder or sleeve 54 and which receives the end of the plunger 52. The matching faces of the hubs of the arms 41 and 46, are formed with coacting teeth 57, which are of such design that when the arms 41 and 46 are pulled upwardly by their respective reins 36 and 37, the hubs of said arms will ride upon each other, separating slightly, moving the cap plate 56 outwardly and with it, the plunger 52, to release the casting 42, as will be understood, whereby to allow the said casting 42 to be drawn upwardly on the bar 17, and such movement will reciprocate the cable or rope 58 and transmit oscillatory movement to the rock shaft 9 through the disc or plate 47. The upward movement of the arms 41 and 46 is limited by the laterally extending lugs 58 on the casting 42. It is to be understood that individual movement of either the arm 41 or arm 46, when oscillated upon the casting 42, will not effect the release of said casting, and therefore, no upward movement of the same. As previously stated, during steering movement by either of the reins 36 or 37, the bar 17 is oscillated, but during the control movements of the control lever of the vehicle, the casting 42 is moved upwardly on the bar 17 to permit oscillation of the shaft 9 through the disc or plate 47.

In Figures 2, 13 and 14, by dotted lines, the respective movements of the plunger 52, the cap plate 56 and the arms 41 and 46 are shown diagrammatically.

In Figure 2, in which the motor vehicle is illustrated by dotted lines, the control lever is designated D, and is there shown in a neutral position. If oscillated forwardly or to the left, it would be in a position of slow speed and if oscillated rearwardly or to the right, would be in the medium speed, provided said lever D had not been moved laterally from its present position, so as to effect high speed of the vehicle, as will become further apparent.

On the end of the rock shaft 9, opposite to that on which is secured the segment disc or plate 47, is secured an arm 59 in which is journaled a roller 60. On the rock shaft between the arm 59 and the angle bend 8 of the bar 6, is carried a coil spring 61, see Figure 1, one end of which is connected with the arm 59 and the other to the angle bend 8 of the bar 6. The spring tends to keep the arm 59 in an upward or normal position, being that position shown in Figure 3, in which the roller 60 is elevated above and out of contact with the clutch lever E shown in dotted lines in said last mentioned figure. These parts last referred to, relate to the control of the clutch lever E which is actuated simultaneously with the movement of the control lever D, when changing speeds.

I have previously referred to a bracket which is slidably carried on the bar 7 of the attachment frame. This bracket which is designated 62, is best seen in Figures 11 and 12, although also shown in Figures 1 and 2 of the assembled views. This bracket on its front side, is provided with the spaced laterally extended bearings 63, in which is secured a rod 64, disposed longitudinally of said bracket and slidably connected with said rod is the end of a bar 65, which at its other end is connected preferably by means of a cotter-pin with a toothed disc 66, and it is intended that when rotational movement is imparted to said disc 66, the bar 65 will be reciprocated and impart corresponding movement to the slidable bracket 62. To take up any jar incident to the movement of the bar 65 and yieldingly throw the control lever D into different speeds I provide coil springs 64' on the rod 64 between the end of the bar 65 and the bearings 63, see Figure 11. The said bracket 62 on its inside face, is provided with the laterally extended spaced lugs 67 and 67' and it is between these lugs, which lie in a horizontal plane, that the control lever D is positioned, and said lugs are sufficiently long so that when the control lever D is shifted laterally so as to be transferred from low or medium to high or reverse speeds, the said lever is not out of control by the said lugs 67 or 67'. The lug 67 is formed with a bearing so as to receive a short shaft 68 formed with an upwardly extended and angularly shaped arm 69, which crosses the space between the two lugs 67 and 67', and is intended to prevent lateral motion of the control lever D from low or medium to high or reverse speeds, except under the action of elements to be described, and said shaft 68 is under the control of a spring 70, so that when the control lever D is moved to a neutral position from high or reverse, the extension 69 of the shaft 68 under the action of the spring 70, will return said control lever D to the neutral position between low and medium speed being that position shown in full lines, Figures 11 and 12, the dotted line position to the lever D in said figures shows the neutral position of the lever between high and reverse speeds. The said lugs 67 and 67' are further provided with trunnions 71, on which is fulcrumed the bifurcated sides of a swingable plate 72, said plate being bifurcated so as to straddle the control lever D as shown in the full and dotted line positions in Figures 11 and 12. This hinged plate 72 normally extends across the slidable bracket 62 and has connected thereto, a chain or cable 73 which extends upwardly and is connected to an arm 74 pivoted at 75 to the upper end portion of the bar 1 of the attachment frame, and on the free end of said arm 74 is journaled a sheave wheel 76 for purposes to be explained.

Suffice it to say for the present, that when the plate 72 is raised from the full line position shown in Figure 12 to its dotted line position, the control lever D will be swung over from the neutral position between low and medium speeds, to the neutral position between high and reverse speeds, such movement of the control lever D throwing the crooked portion 69 of the shaft 68 outwardly against the tension of the spring 70, and when the parts controlling the control lever D are released, said spring 70 will transpose said control lever D from the dotted line position shown in Figure 12 to the full line position shown in said figure.

Referring to the toothed segment 66 previously referred to, this disc is formed with an elongated hub journaled on a sleeve 77 connected with the bar 7 of the attachment frame by the bolt 78, and on the elongated hub of said toothed disc 66, is carried a plate 79, capable of rotational movement on said hub, and also a cam member 80, which is so constructed, that it is secured to the elongated hub 66 to be rotated therewith, when movement is imparted to the toothed disc 66 proper. The plate member 79 has connected therewith, a pawl 81 adapted to have engagement with the teeth of the toothed disc 66, and by means of such engagement and the movement of the pawl to impart rotational movement to said disc 66. I prefer to provide said disc 66 with only four teeth, so constructed that the pawl 81, when engaging the same, and moved, will impart rotational movement to the disc and be easily disengaged and moved away therefrom. Further, the teeth are so constructed as to permit of engagement by the toothed end of a pawl 82 and when so engaged by said last mentioned pawl, the disc 66 is held against backward rotational movement. The normal operation of the toothed disc is anti-clockwise.

To the plate 79 is pivotally connected one end of a bar 83, the opposite end of which has a pivotal connection with the plate or arm 84 secured to the end of the rock shaft 9 immediately back of the segment disc or plate 47. It is to be understood that when the rock shaft 9 is oscillated or has rotational movement imparted thereto, it will impart the corresponding movement to the plate 84, which in turn, will reciprocate the bar 83 and cause alternate oscillatory movement to be imparted to the plate 79 of the elongated hub of the toothed disc 66. When the rock shaft 9 is rotated in a clockwise direction, the movement imparted to the plate 79 through the reciprocation of the connecting bar 83, is to first oscillate it in a backward direction with its pawl 81 moved out of engagement with a tooth of the disc 66, and during the continued rotational movement of said rock shaft 9, it carries with it, the plate 84, the connecting bar 83 is then swung in an upward direction, returning the plate 79 to the full line position shown in Figure 3, causing the pawl 81 to come into engagement with a tooth of the disc 66, and the further continued rotational movement of the rock shaft 9, carries with it, the connecting bar 83 to the limit of its upward throw, which causes the pawl 81 engaging a tooth on the disc 66, to impart to the latter a quarter turn. This partial rotation of the disc 66 reciprocates the connecting bar 65 and it in turn, moves the slidable bracket 62 which oscillates the control lever D to change its position from neutral to low speed, assuming, of course, that this is the first or initial movement of said control lever.

Figures 3, 4, 5, 6:
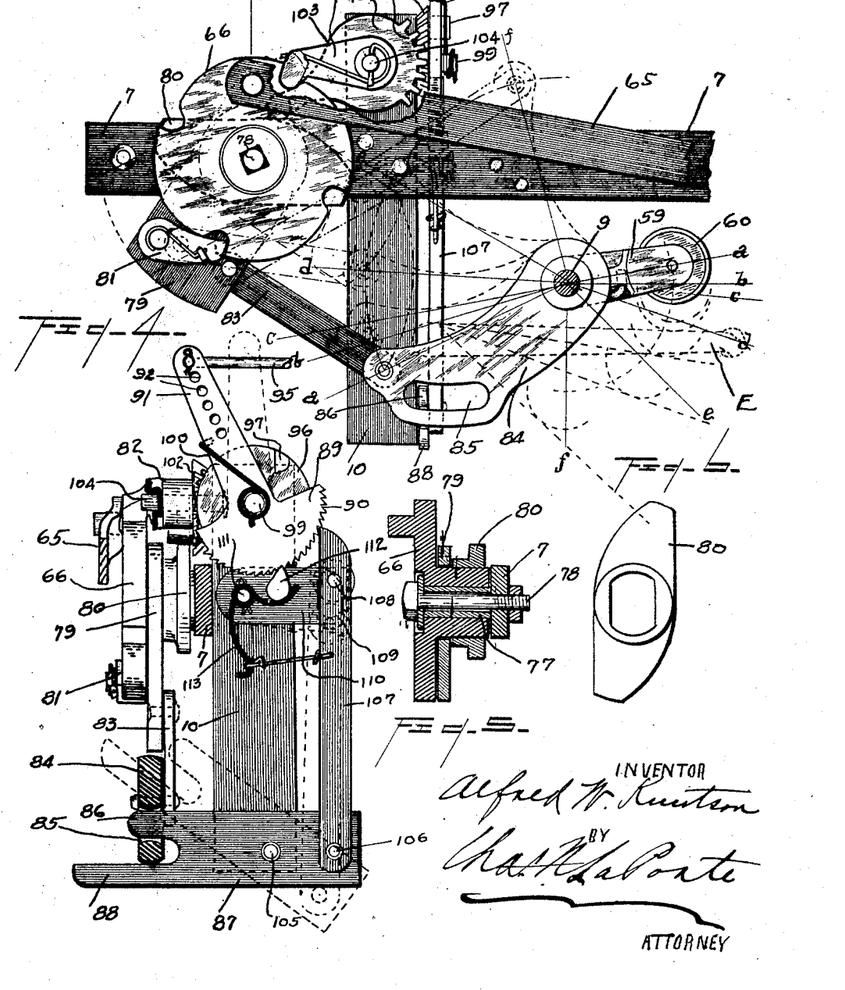
Figure 3 is a detail side elevation of the control lever shifting means, dotted lines illustrating the successive positions of the clutch lever relative to the positions of the control lever.
Figure 4 is a detail in elevation showing the mechanism for actuating the fuel supply elements.
Figure 5 is a detail in section showing the assembled relation of certain elements illustrated in Figures 3 and 4.
Figure 6 is a detail view of a cam member illustrated in Figures 3 and 4.
Figures 7, 8, 9:
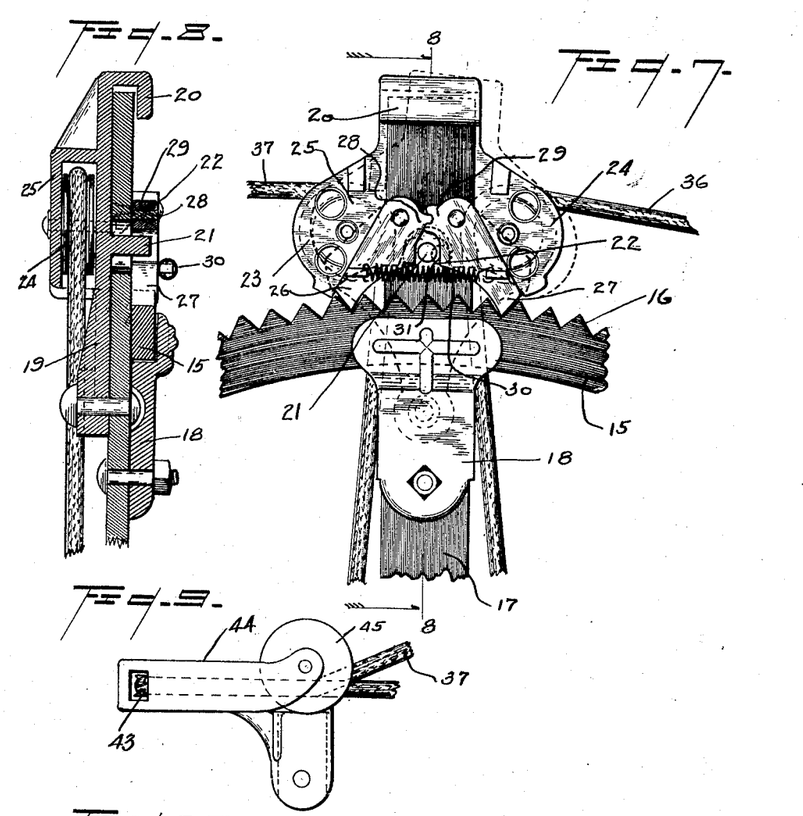
Figure 7 is an enlarged detail in side elevation showing the locking means for the steering elements.
Figure 8 is a vertical cross-section, as the same would appear if taken on the line 8—8 of Figure 7.
Figure 9 is a detail in side elevation showing sheave wheel construction for guiding one of the reins.
Figure 10:
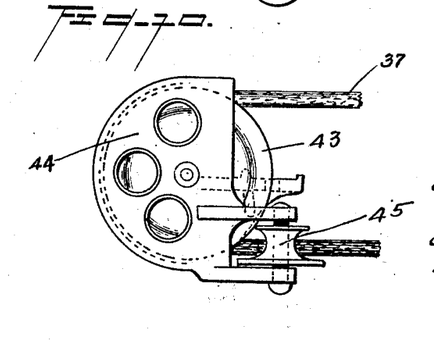
Figure 10 is a plan view of the parts seen in Figure 9.

The plate 84 is slotted at 85 to receive a short finger or tooth 86 of plate 87, also formed with a long finger or tooth 88, normally crossing the underside of the plate 85 and extending outward therefrom, a suitable distance as shown in Figure 4. The plate 87, the pawl 82, and the camlike member 80 relating to the means for actuating and controlling the fuel supply parts, will be hereinafter more particularly referred to.

The normal position of the cam member 80, when the control lever D is in a neutral position, is approximately horizontal, and the position of said cam member when said control lever D is in low or medium or high, is approximately in a vertical position.

In the operation of changing the control lever D from neutral position to low or medium speeds, which might also be said for high or reverse speeds, it is first necessary, as will be understood in the operation of a motor propelled vehicle of the type referred to, to release the clutch lever E (assuming that the engine is running); and during the release of the clutch lever, the parts which I have described, are so timed in their movements that the plate 79, associated with the toothed disc 66, may be moved a predetermined distance and returned to cause the engagement of the pawl 81 with a tooth of the disc 66, whereby to impart rotational movement to said disc 66, and to shift the control lever D, through the reciprocation of the bar 65, connected with the toothed disc 66 and the slidable bracket 62.

In Figure 3, dotted lines diagrammatically illustrate and designate different positions of the clutch lever E, and also the plate 84 and the connecting elements which are instrumental in the oscillation of the toothed disc 66, through the rotational movement imparted to the rock shaft 9, when a direct pull is made upon the two reins 36 and 37. The designating lines $a, b, c, d, e$ and $f$, Figure 3, to the right of a line passing vertically through the axis of the shaft 9, indicate the successive axial positions of the roller 60, carried by the rock shaft 9, which engages with the clutch lever E for releasing it during the shifting of the control lever D, and the corresponding designating lines $a, b, c, d, e$ and $f$, Figure 3, to the left of a line passing vertically through the axis of the shaft 9, indicate the successive positions of the pivotal connection between the bar 83 and the plate 84, and which positions are assumed during the movement of the plate 79 to impart rotational movement to the disc 66, when the shaft 9 is oscillated from $a$ to $f$.

Assuming now that the parts are in the relative positions shown in Figures 2 and 3, and it is desired to move the control lever D forward into slow speed, (assuming the engine to be running) the operator will pull back upon the two reins 36 and 37, oscillating the arms 41 and 46 to withdraw the plunger 52, releasing the casting 42 to permit of upward movement of the casting 42 on the bar 17, which will reciprocate the cable or rope 48, and through its connection with the segment disc or plate 47, impart rotational movement to the rock shaft 9, such movement of the shaft 9 lowers the roller 60, bringing it into contact with the clutch lever E. When the axis of this roller reaches the point $c$, the roller is in engagement with the clutch lever E, and when the axis of this roller reaches the point $d$, the clutch lever E is released. As the shaft 9 is rotated, it imparts a like movement to the plate 84, and it, through its connection with the bar 83, reciprocates the latter, the position of the pivotal connection between the plate 84 and the bar 83, being shown at points $a$, $b$ and $c$, which correspond to the indicating points $a$, $b$ and $c$ of the roller 60. When the axis of the roller reaches the point $d$, the plate 84 has been swung in the arc of a circle, where its pivotal connection with the bar 83 is correspondingly shown at $d$, which has shifted the plate 79 to the limit of backward throw, with the pawl 81 away from the disc 66, and when the axis of the roller 60 reaches the point $e$, the plate 84 has been swung upwardly with its pivotal connection with the bar 83 also shown at $e$, which has returned the plate 79 to a position with its pawl 81 in engagement with a tooth of the disc 66, and it is when the axis of the roller 60 reaches the point $f$, that the plate 84 has been swung sufficiently far upwardly, so that its pivotal connection with the bar 83 has also been moved to the point $f$, swinging the plate 79 on the hub of the disc 66, and through the engagement of the pawl 81 with a tooth of the disc, causing the disc to be rotated one quarter of a turn. This imparts sufficient reciprocal movement to the bar 65, connected with the disc 66, so as to reciprocate the slidable bracket 62 to a position which will carry with it, the control lever D into low speed.

The dotted line positions of the arms 41 and 46, diagrammatically shown on Figure 2, correspond to similar positions indicated by the characters just previously referred to on Figure 3. It will be understood that when the reins 36 and 37 are released by the operator, the stored up energy in the spring (not shown) connected to the clutch lever E, through the depression of said lever, will return the lever to its normal position, raising the roller 60, and imparting reverse rotational movement to the rock shaft 9, and when the said lever E, through the action of the spring connected therewith, has been returned to its normal position, the spring 61 on the shaft 9 will raise the roller 60 to a disengaged position immediately above the clutch lever E, see Figure 3.

The operator may change the control lever D from low speed to neutral, and then to medium speed, by releasing the reins, permitting the parts described to return to their initial positions, and then by a direct pull upon the two reins, as previously described, impart corresponding movement to the elements, and again rotate the toothed disc 66 an additional one-quarter turn, which will move the control lever D back to neutral and then again through the same process of movements, impart an additional one-quarter turn to the toothed disc 66 and move the lever D to the position of medium speed. It is understood that with each alternate rotational movement imparted to the toothed disc 66, the control lever D is moved to a neutral position. That is to say, when the pivotal connection between the bar 65 and the disc 66 is in the position above or below the axis of the disc, and in a line extending vertically through the axis of the disc, the control lever D is in a neutral position, but when the pivotal connection between the bar 65 and the disc 66 is in a position upon opposite sides of the axis of the disc and in a line extending horizontally therethrough, the control lever may be in one or the other of the positions of low, medium, high or reverse speeds. It should be further understood, that the operator need not necessarily release the reins to permit the operating parts, previously described, to return to their initial positions for imparting rotational movement to the disc 66, but that he may release the reins sufficiently to return the parts to the position indicated by the designating lines d, which position of such parts causes the pawl 81 on the plate 79 to again engage with a tooth on the disc 66, and then by an additional pull, said disc may have imparted thereto, an additional quarter turn. This operation may be continued, as desired, by a slight release of the reins, and then an additional pull.

It is to be further understood that by a direct pull upon the two reins 36 and 37, the fuel supply may be increased, for the purpose of accelerating the engine. I accomplish this in a manner and by a means about to be described, and through the oscillation of the shaft 9. As also will be further explained, this regulation of the fuel supply may be made during the movement of the vehicle when in any of the various speeds, and without the necessity of actuating the means which controls the movement of the control lever D to change the speeds.

*Fuel supply control means.*—This mechanism, which is also actuated through and by means of the rock shaft 9, is best seen in Figures 3 and 4, and particularly the latter figure. To support this mechanism, there is provided the short upstanding angle iron bar 10, previously referred to. To the upper end of this bar and on its face next adjacent to the upstanding angle iron bar 1 of the attachment frame, there is carried a plate member 89 formed with a segment having on its peripheral edge, a plurality of ratchet teeth 90. This plate member 89 is preferably formed with the crank extension 91 provided with a plurality of perforations or openings 92. This crank extension with its plurality of perforations, forms a means of connection between the plate member 89 and the fuel supply control means. This last mentioned means is represented by the crank arm 93, see Figure 1, also provided with a plurality of perforations 94. Connecting the crank bar 93 and also the crank extension 91 of the plate member 89, is a rod 95, see Figures 1 and 4, and this rod may have connection with the crank extension 91 and the crank arm 93, through either of the perforations in said members, whereby an adjustable connection may be made between these parts to regulate the movement of the crank arm 93, and thereby control the amount of fuel supplied when the plate member 89 is actuated.

Associated with the plate member 89, next adjacent thereto, and also supported on the same bearing member, is a disc 96, having on one face the lug projection 97 and on its other face, a segment gear 98, see Figure 3. The bearing member for the plate 89 and the disc 96 constitutes preferably a stem 99, projecting from the upright frame member 10. The plate member 89 and the disc 96 are preferably independent of each other, and to the plate member 89 may be imparted rotational movement in one direction, without disturbing the disc 96, but when moved in the other direction, and at times by engagement with the lug 97 on the disc 96, will have engagement with the latter, to impart rotational movement thereto. Also, the disc member 96 when rotational movement is imparted thereto in one direction, its lug 97 may engage with the crank extension 91 of the member 89 to impart rotational movement to the latter. To retain the plate member 89, and also the disc 96 in their normal positions, a spring member 100 is coiled about the stem 99 with one end connected thereto, and the other end of the spring extends up and engages with the crank extension 91 of the member 89, see Figures 3 and 4. Having a meshing relation with the segmental gear 98 on the disc 96, is a segmental gear 101 on a disc 102, formed with an arm extension 103. The disc 102 is disposed at right angles to the disc 96 and is journaled on a spindle 104 connected with the upstanding frame member 10 and on said spindle 104 is carried the pawl 82, previously referred to, which is yieldingly held in engagement with the peripheral surface of the toothed disc 66, whereby the pawl 82 may enter successively, the teeth of the said disc 66, as it is revolved in the manner previously described, and for locking the said disc 66 against reverse motion.

The extension 103 of the disc 102 is adapted to ride on the cam member 80, and as the cam is rotated through the action of the disc 66, said cam will alternately raise and lower the extension 103 and by such movement, impart alternate rotational movement to the disc 102, which in turn, through its segmental gear 101, impart a like movement to the disc 96.

To actuate the ratchet member 89 from and by means of the rock shaft 9, there is provided the plate member 87 previously referred to, as having the short and long fingers or teeth 86 and 88, which said plate 87 is pivotally connected at 105 to the lower end of the upstanding attachment frame member 10, and to said plate member 87, is pivotally connected at 106, an elongated toothed bar 107, which is provided with a pin 108, passing through an elongated slot 109 arranged approximately vertically in the plate 110 pivoted at 111 to the frame member 10. The plate member 110 is provided with the fixed dog 112, which like the end of the toothed bar 107, is adapted to have engagement with the ratchet teeth 90 on the plate member 89. The relation of the toothed bar 107 and the plate 110 is maintained by a spring connection 113, said spring coiled about the pivot member 111 and bearing under the dog 112 to hold the plate member 110 in its normal position.

In the operation of the rock shaft 9, and the oscillation of the plate member 84, the plate 87 is oscillated on its pivot 105, which lowers the toothed bar 107, moving it out of contact with the ratchet teeth on the plate member 89, the slot 109 in the plate member 110 allowing limited movement of the pin 108 therein, without affecting the movement of the plate 110. The rock shaft 9 and the plate member 84 may be given one complete operation, going through the cycles of movements from $a$ to $f$, both inclusive, which will move the plate member 87 into the dotted line position shown in Figure 4, the short finger or tooth 86 being swung out of the path of the plate 84, while the long finger or tooth 88 will remain in relation to the said plate member 84, so that when it is returned to its normal position, it will impart opposite oscillatory movement to the plate 87, when the short finger or tooth 86 will again enter the slot 85 in the plate member 84; and as the plate member 87 assumes its normal position, the toothed bar 107 will again enter into contact with the tooth of the plate member 89.

It is to be understood that the dog 112 on the plate 110, acts to hold the plate member 89 in its different adjusted positions, and is released from the teeth of the plate member 89 when the toothed bar 107 is moved a complete stroke and during the operation of the rock shaft 9. A full stroke of the toothed bar 107 will cause its pin 108 to engage with the lower end of the slot 109 in the plate 110 and impart oscillatory movement to the latter, as shown in dotted lines in Figure 4. The construction and relation of the parts is such that the dog 112 is released from the teeth of the plate member 89 when the rock shaft is rotated from point $a$ to point $c$ and during the return of the bar 107 the member 89 is moved one tooth.

I wish it understood that under varying conditions of load, and when it is necessary to increase the fuel supply for accelerating the engine, such as for instance, when the motor vehicle is moving upward on a grade or over rough ground, that by short jerky pulls on both of the reins 36 and 37, the operator may impart slight oscillatory motion to the shaft 9, and through it to the plate 84, which will in turn, impart slight oscillatory movement to the plate 87, lowering and raising the toothed bar 107, which will move from and into engagement with the ratchet teeth 90 on the plate member 89, and cause intermittent oscillatory motion to the latter, which will reciprocate the connecting bar 95, and thereby actuate the crank 93 for supplying the fuel to the engine. It is to be further understood that when the operator releases the two reins 36 and 37, permitting a return of the operative parts to their normal positions, under the action of the spring connected with the clutch lever E, that the final movement imparted to the rock shaft 9, through the action of the spring 61, raises the roller 60 from contact with the clutch lever E, that such motion will be imparted to the toothed bar 107 through the connection of the plate member 84 and plate 87 therewith, which will move the plate member 89 the distance of one tooth, for the purpose of supplying just a sufficient amount of fuel to allow the engine to idle.

I have purposely omitted describing in connection with the description relating to the lever control, the shifting of the lever from neutral position between low and medium speeds to high speed so as to avoid confusion in the movement of the control lever to attain low and medium speeds from neutral, as it is not necessary to the accomplishment of my purposes, to run the motor vehicle at high speed for farm use, as the low and medium speeds are quite effective, but when high speed is desirable, the construction and arrangement of the rein control is such that this may be attained through and by means of the mechanisms which I have described.

To put the vehicle in high speed, it is necessary to shift the control lever D from the position shown in full lines in Figures 11 and 12 to the position shown in dotted lines in said figures. To move the control lever D from the neutral position between low and medium to the neutral position between high and reverse, the operator will whip the rein 37 under the sheave wheel 76, journaled on the pivoted arm 74, see Figure 2, in which the rein 37 is shown in dotted lines, whipped under the sheave wheel 76. It is now apparent, that when he draws upon the two reins 36 and 37, he will lift the pivoted arm 74, raise the chain or cable 73, which will in turn, lift the hinged plate 72, Figures 11 and 12, which will bear against the control lever D and move it from the full line position shown in Figure 12, to the dotted line position in said figure, and then through the same process of pull upon the two reins, as has been previously described; for the purpose of oscillating the rock shaft 9, the control lever D is moved into high speed. To move the control lever D from the neutral position shown in dotted lines in Figure 12 to its normal neutral position between low and medium speeds, all that is necessary for the operator to do, is to whip the rein 37 from under the sheave wheel 76, releasing the pivoted arm 74, when the spring 70 will exert its pressure upon the crooked portion 69 of the shaft 68, and return the control lever D to its normal neutral position.

I have previously suggested that disconnection of certain of the elements of the attachment could be made, which would permit an operator to control the vehicle by the controlling devices supplied therewith, instead of the rein control means herein described. To the accomplishment of this end, the operator may disconnect the connecting rod 95 from the fuel control crank arm 93 and also disconnect the bar 65 from the toothed disc 66 by the removal of the cotter pin providing this connection. This leaves the steering means, fuel control means and clutch control levers free for manual operation by the operator sitting on the motor vehicle.

The dogs 26 and 27 have a pivotal connection with the oscillatory arm or bar 17, locking the bar 17 and through it, the steering appliances to hold the steering wheels against accidental turning and as has been explained in the operation, when one of the dogs is moved out of engagement with the teeth on the bar 17, by a pull on a rein, the other dog is also released so as to allow the bar 17 to be swung on its pivot, and by such movement impart movement to the steering appliances. When it is desired to control the motor vehicle by the steering and other control means thereon provided, and the parts have been detached, as just above described, to release the locking of the steering appliances, the dogs 26 and 27 are swung up and back on their pivots and retained in this disconnected position from the teeth on the bar 16, by means of the spring 30.

It should be apparent from the foregoing description and disclosure in the drawings, that I have provided a very efficient, and yet simple and easy to operate, rein control attachment for motor vehicles, which when applied, will convert the present-day tractor or like vehicle, to the rein control type, whereby in the operation and control of farm equipment, an implement may be attached to and drawn by the motor vehicle, and the latter controlled by one operator riding upon the drawn implement, who, through the provision of two reins, may control the steering of the motor vehicle, control its fuel supply, control the control lever, while at the same time control the clutch lever, which is essential at the time of the shifting of the control lever to place the vehicle in motion, and to change the speeds thereof. Provision is made for actuating the fuel supply means through pull upon the two reins at any time it is desired to accelerate the engine, and without disturbing the operative parts.

What I claim is:

1. An attachment for motor vehicles to convert same to rein control, including means for connection with the steering appliances; means for connection with the fuel control means; means for shifting the control lever; means for actuating the clutch lever; and rein means operatively connected with said steering connecting means and with said fuel control and control lever connections and clutch lever actuating means, so as to allow of selective operation of the steering appliances independently of said other appliances, and to operate the fuel control means independent of said other appliances, and for operating said clutch lever, control lever and fuel supply means independent of said steering appliances.

2. An attachment arranged for securement to motor vehicles to convert same to rein control, including an upstanding oscillatory member arranged for connection with the steering appliances; means for shifting the control lever from neutral to either of the positions of low, medium or high speeds including a rockable member in operative connection with said oscillatory member, and rein means operatively connected with said steering connecting member and with said control lever shifting means, so as to allow of selective operation of said steering appliances and control lever, either independently or simultaneously.

3. An attachment for motor vehicles to convert same to rein control, including means for connection with the steering appliances; means for connection with the fuel control means of the vehicle, and rein means operatively connected with said steering connected means and with said fuel control connection, so as to allow of selective operation of said steering appliances and fuel control means, either independently or simultaneously.

4. An attachment for motor vehicles to convert same to rein control, including means for connection with the steering appliances; means for shifting the clutch lever; means for shifting the control lever, rein means operatively connected with said steering connecting means and with said clutch shifting and control levers, so as to allow of selective operation of the steering appliances and clutch and control levers, either independently or simultaneously, and means operated by the rein means for releasing the clutch lever preceding the operation of said control lever.

5. An attachment for motor vehicles to convert the control lever to rein control, including means for shifting said lever from a neutral position to positions of different speeds, and rein means for actuating said lever shifting means, said shifting means being so arranged that alternate movements thereof places said lever in neutral positions.

6. An attachment for motor vehicles to convert the control lever to rein control, including means formed for attachment to and for shifting said lever from neutral position to positions of different speeds, and rein means operatively connected to said lever shifting means, so as to selectively shift said lever to positions of low and high speed and alternately in neutral position between low and high speeds.

7. An attachment arranged for securement to a motor vehicle for converting the fuel supply control means to rein control, including a rockable member, operative connections including a ratchet means between said member and fuel supply control means, and rein means in operative connection with said member.

8. An attachment for motor vehicles to convert the clutch and control levers and fuel control means to rein control, including means formed for attachment to and for operating said control lever; means for actuating the clutch lever, said last named means being timed relative to the control lever operating means, whereby the clutch lever is released before the operation of said control lever; means formed for attachment to and for operating the fuel control means, and rein means operatively connected with said control lever attachment, clutch lever actuating means and said fuel control attachment means, so as to allow of a selective operation of the fuel control means independent of said clutch and control levers.

9. In a rein control for motor vehicles, an attachment arranged for bodily securement to the vehicle, a member on said attachment adapted to be connected to the steering appliances connecting the steering post and steering wheels, a bar pivotally connected with said attachment, connections between said bar and said member, means for locking said bar in different positions, and rein means for oscillating said bar in opposite directions, said locking means releasable by said reins.

10. In a rein control for motor vehicles, an attachment arranged for bodily securement to the vehicle, a member pivotally mounted on said attachment and adapted to be connected to the steering appliances connecting the steering post and steering wheels, a bar pivotally connected with said attachment, means to operate said member from said bar, a rack on said attachment, means on the bar having engagement with the rack to lock the bar and said steering appliances, and rein means to move said bar in opposite directions and also arranged to release said lock.

11. In a rein control for motor vehicles, an attachment arranged for bodily securement to the vehicle, including means formed for attachment to and for operating the control lever; means to actuate the clutch lever and a member pivotally connected to said attachment; means operatively connecting the member to the steering appliances, and rein means operatively connected with said member and with said control lever attachment and clutch lever actuating means, so as to allow of selective operation of said member independent of or with said clutch and control lever operating means.

12. In a rein control for motor vehicles, an attachment arranged for bodily securement to the vehicle, means on the attachment for moving the clutch lever, means on the attachment for moving the control lever, and rein means for operating both said lever moving means, said clutch lever moving means having a predetermined movement in advance of said control lever moving means, whereby said clutch lever may be thrown out before the movement of the control lever is initiated.

13. In a rein control for motor vehicles, an attachment arranged for bodily securement to the vehicle, including means for actuating the clutch lever; means formed for attachment to and for operating the control lever and means formed for attachment to and for operating the fuel control means, said clutch lever actuating means having a predetermined movement in advance of said control lever operating attachment, and rein means operatively connected with both said lever operating means and said fuel control means, so as to allow of simultaneous actuation of said fuel control means and said lever control means.

14. In a rein control for motor vehicles, an attachment arranged for bodily securement to the vehicle, a rock shaft, means operated by the rock shaft for moving the clutch lever, means operated by the rock shaft for moving the control lever, and rein means for imparting rotational movement to said rock shaft, whereby said clutch lever may first be released and subsequently said control lever moved.

15. In a rein control for motor vehicles, an attachment arranged for bodily securement to the vehicle, a rock shaft, means operated by the rock shaft for moving the clutch lever, means operated by the rock shaft for moving the control lever, means operated by the rock shaft for actuating the fuel control means, and rein means for imparting rotational movement to said rock shaft, whereby said fuel supply control means, clutch lever moving means and control lever moving means may be operated sequentially.

16. In a rein control for motor vehicles, an attachment arranged for bodily securement to the vehicle, a rock shaft, means operated by the rock shaft to impart movement to the fuel supply control means, clutch lever and control lever, a member pivoted on said attachment and having connection with the steering appliances on the vehicles, means on said member in operative connection with said rock shaft, and a pair of reins connected with the means on said member, a pull on either one of said reins oscillating said member and actuating said steering appliances and a direct pull on both said reins, in unison, operating said rock shaft and imparting movement to said fuel supply control means, and clutch and control lever actuating means.

17. In a rein control for motor vehicles, an attachment arranged for bodily securement to the vehicle, a rock shaft, means actuated by the rock shaft for moving the clutch lever, means actuated by the rock shaft for moving the control lever, means actuated by the rock shaft for operating the fuel supply control means, a member on the end of rock shaft, a bar fulcrumed on said attachment and connected with the steering appliances, a member slidable on said bar, a pair of reins connected with said slidable member, and a flexible connection between the slidable member on said bar and the member on said rock shaft, said flexible connection crossing the fulcrum of said bar on the attachment, a pull on either rein imparting oscillatory movement to said bar and actuating said steering appliances, and a direct pull on both said reins reciprocating said slidable member and imparting oscillatory movement to said rock shaft, whereby said fuel supply control means, and clutch and control lever actuating means are operated.

In witness whereof, I have hereunto affixed my hand this 29th day of May, 1920.

ALFRED W. KNUTSON.